United States Patent

Tagami et al.

[11] Patent Number: 5,200,662
[45] Date of Patent: Apr. 6, 1993

[54] JOINT STRUCTURE OF RADIAL TYPE ROTOR AND OUTPUT SHAFT IN SYNCHRONOUS MOTOR

[75] Inventors: Kiyoshi Tagami, Hachioji; Hiroyuki Uchida, Minamitsuru, both of Japan

[73] Assignee: Fanuc Ltd., Yamanashi, Japan

[21] Appl. No.: 469,466

[22] PCT Filed: Jul. 17, 1989

[86] PCT No.: PCT/JP89/00715
§ 371 Date: Mar. 30, 1990
§ 102(e) Date: Mar. 30, 1990

[87] PCT Pub. No.: WO90/01825
PCT Pub. Date: Feb. 22, 1990

[30] Foreign Application Priority Data
Aug. 2, 1988 [JP] Japan .................. 63-192027

[51] Int. Cl.$^5$ ............................ H02K 1/22
[52] U.S. Cl. ......................... 310/261; 310/42; 310/43; 310/114; 310/156
[58] Field of Search ........... 310/42, 43, 45, 156, 310/214, 215, 261, 126, 114, 162; 29/598; 264/272.11, 272.19, 272.2; 464/96, 161, 179, 900

[56] References Cited

U.S. PATENT DOCUMENTS

| | | | |
|---|---|---|---|
| 3,221,194 | 11/1965 | Blackburn | 310/156 |
| 3,917,967 | 11/1975 | Robinson | 310/43 |
| 4,263,711 | 4/1981 | Sakano | 310/43 |
| 4,543,506 | 9/1985 | Kawada | 310/156 |
| 4,570,097 | 10/1987 | Kawada | 310/156 |
| 4,678,954 | 7/1987 | Takeda | 310/156 |
| 4,954,736 | 9/1990 | Kawamoto | 310/156 |

FOREIGN PATENT DOCUMENTS 59-59056  4/1984  Japan .
60-183547 12/1985  Japan .

*Primary Examiner*—R. Skudy
*Attorney, Agent, or Firm*—Nikaido, Marmelstein, Murray & Oram

[57] ABSTRACT

The present invention relates to a joint structure of a rotor (12) and an output shaft (10) in a synchronous motor, the rotor having an alternate circumferential arrangement of rotor cores (16) and magnets (14). A molding resin (24) is filled and hardened in the gap between the inner circumference of the rotor (12) and the surface of the output shaft (10) so that the components (10, 12) are fixedly jointed together with a high reliability and thus the rigidity of the output shaft (10) is enhanced.

6 Claims, 2 Drawing Sheets

JOINT STRUCTURE OF RADIAL TYPE ROTOR AND OUTPUT SHAFT IN SYNCHRONOUS MOTOR

TECHNICAL FIELD

The present invention relates to a joint structure of an output shaft and a radial type rotor comprising an alternate circumferential arrangement of rotor cores and magnets.

BACKGROUND ART

Usually, a radial type rotor is mounted fixedly on an output shaft by attaching end plates to the opposite ends of the rotor, and fixing the end plates to the output shaft. A shrinkage fit is another method of fixedly mounting a rotor on an output shaft. Another method is the use of pins for fastening a rotor to an output shaft. Most rotors are impregnated with an impregnant to prevent the play of the component rotor cores and magnets thereof relative to each other.

When the rotor is assembled by either the method employing a shrinkage fit or the method using pins, a gap is formed between the rotor and the output shaft, except for end portions of the rotor, and therefore, the output shaft within the rotor is bent when an external force acts on the rotor assembly. The method employing a shrinkage fit is unable to fasten a long, high-torque rotor to an output shaft with a high reliability, because torque is transmitted from the rotor to the output shaft through only the two front and rear portions where the rotor and the output shaft are joined together by a shrinkage fit, regardless of the length of the rotor, while the output torque of a longer rotor is greater than that of a shorter rotor.

DISCLOSURE OF THE INVENTION

Accordingly, to solve the above problem, an object of the present invention is to provide a joint structure of a rotor and an output shaft, capable of preventing the bending of the output shaft and fastening the rotor to the output shaft with a high reliability.

In view of the above object, the present invention provides a joint structure of a radial type rotor and an output shaft in a synchronous motor, the rotor comprising an alternate circumferential arrangement of rotor cores and magnets, characterized in that a resin for molding is filled and hardened in a gap between the inner circumference of the rotor and the circumference of the output shaft.

Since the molding resin is filled and hardened in the gap between the inner circumference of the rotor and the circumference of the output shaft, a bending action on the output shaft is unable in practice to bend the output shaft. Since the torque generated by the rotor is transmitted through the molding resin filling the gap over the entire length of the rotor to the output shaft, the local concentration of torque, namely, the concentration of torque on portions corresponding to the opposite ends of a rotor, is obviated. Thus the joint structure of a rotor and the output shaft has a high reliability structure and a high torque transmitting reliability.

BEST MODE OF CARRYING OUT THE INVENTION

Figure 1:
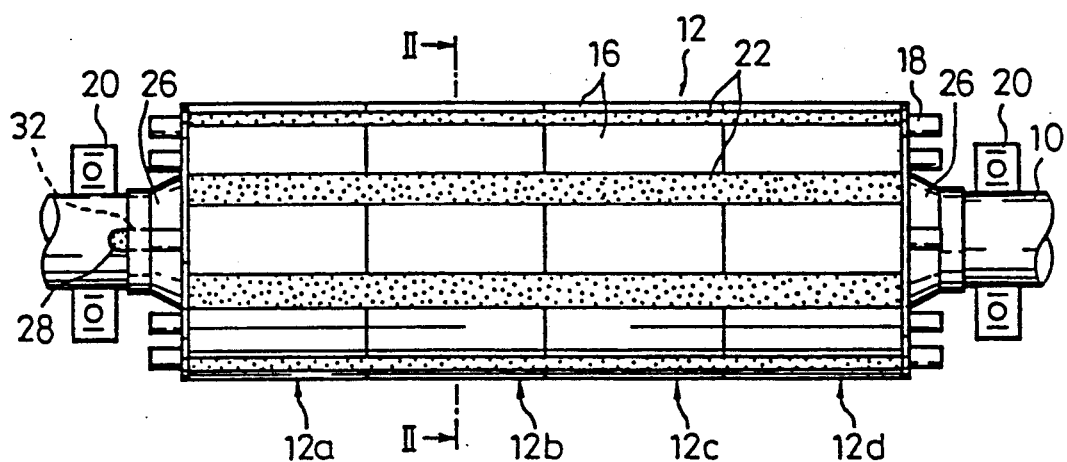
FIG. 1 is a front view of a rotor assembly constructed by joining a rotor and an output shaft according to the present invention.

The present invention will be described in detail hereinafter with reference to the accompanying drawings. A method of fixedly joining a radial type rotor 12 comprising an alternate circumferential arrangement of magnets 14 and rotor cores 16 to an output shaft 10, and a joint structure constructed by the above method will be explained. In this embodiment, the elongated rotor 12 comprises four unit rotors 12a, 12b, 12c and 12d having a predetermined axial length and arranged in an axially contiguous arrangement, and rods 18 for positioning rotor cores 16 at a predetermined radial position in cooperation with end plates 26 are inserted through the cores 16 to hold magnets 14. When the relatively long rotor 12 consisting of the four unit rotors 12a, 12b, 12c and 12d, which are penetrated by the rods 18, is fastened to the output shaft with the end plates 26, a gap 25 is formed between the inner circumference of the rotor 12 and the output shaft 10. The central holes of the end plates 26 provided on the opposite ends of the rotor 12 have a diameter suitable for mounting the end plates 26 on the output shaft 10 by a light press-fitting. The output shaft 10 is pressed into the rotor 12 provided with the end plates 26 at opposite ends thereof by press fitting, by applying a small force to the output shaft 10 to be stopped at a predetermined axial position relative to the rotor 12. The output shaft 10 is provided at a predetermined position with an axial groove 32 having an inlet 28 opening outside and axial outer and of one of the end plates 26. A molding resin, such as an epoxy resin, is injected into the gap between the rotor 12 and the output shaft 10 through the groove 32 to fill the gap with the molding resin. In other words, the rotor is provided with an axially extending inner circumference (see FIGS. 2-4).

Figure 2:
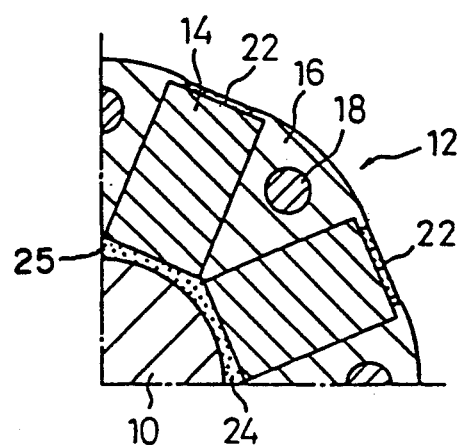
FIG. 2 is an enlarged fragmentary cross-sectional view taken along the line II—II in FIG. 1.
Figure 3:
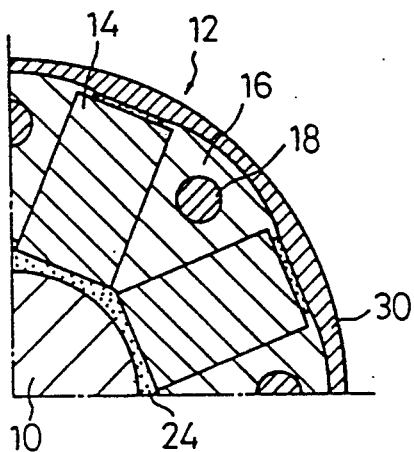
FIG. 3 is a fragmentary cross-sectional view showing a joint structure according to the present invention in one stage of fabrication.
Figure 4:
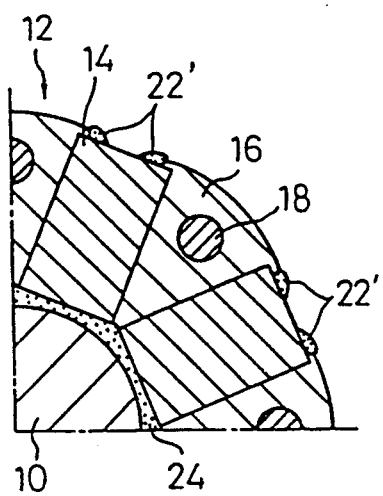
FIG. 4 is a fragmentary cross-sectional view of a rotor assembly constructed by another method of fabrication different from the method shown in FIG. 3.

As the molding resin 24 is injected continuously through the inlet 28 into the gap between the rotor 12 and the output shaft 10 after the gap has been filled with the molding resin, the resin 24 overflows through gaps between the magnets 14 and the rotor cores 16 and flows over the surface of the rotor 12. If the resin 24 is simply injected into the gap, the overflown resin protrudes as shown in FIG. 4 forming resin bulges 22'. As is generally known, a minute clearance is provided between the circumference of the rotor and that of the stator, and hence the resin bulges 22' must not protrude beyond a circle corresponding to the maximum diameter of the rotor. To prevent such an excessive protuberance of the overflown resin, the rotor 12 is covered with a cylindrical jig case 30, as shown by way of example in FIG. 3, when injecting the resin 24 into the gap. Then, the overflow resin 22 is confined within a circle corresponding to the maximum outside diameter of the rotor 12 as shown in FIG. 2. Although the resin filling the gap between the inner circumference of the rotor 12 and the output shaft 10 cannot be observed, the perfect packing of the gap with the resin can be confirmed by the leakage of the resin onto the surface of the rotor 12.

When the resin is thus filled and hardened in the gap between the inner circumference of the rotor 12 and the output shaft 10, a portion of the output shaft 10 between a pair of bearings 20 supporting the output shaft 10 is not subject to bending. As is obvious from FIG. 2, an output torque generated in the rotor 12 is transmitted to the resin 24 filled and hardened in the gap with a required high reliability, because the inner circumference of the rotor 12 has a polygonal shape. The reliability in torque transmission of the circular boundary between the output shaft 10 and the resin 24 is lower than that of a polygonal boundary, and therefore, it is preferable to finish the surface of the output shaft to be coated with the resin 24 by knurling or the like. When determining the shape of the resin 24 filled and hardened in the gap, the concentration of mechanical stresses, and thermal stresses which may be induced by temperature variation, must be taken into account, and the rotor must be designed so that the resin 24 filled and hardened in the gap is formed in a uniform thickness within an allowance and within a range which will not adversely affect the torque transmission reliability of the resin 24 filled and hardened in the gap.

As apparent from the foregoing description, the present invention provides a joint structure of a rotor and an output shaft having a high reliability structure and excellent torque transmission characteristics and capable of a high resistance to a bending of the output shaft.

We claim:

1. A joint structure of a radial-type rotor and an output shaft in a synchronous motor, the radial-type rotor including at least one rotor unit having an axis thereof, a plurality of rotor cores and magnets alternately circumferentially arranged around the axis, and non-magnetic annular-shaped end plates arranged at axially both ends of said rotor unit for fastening said rotor unit onto the output shaft, wherein:

said rotor unit is provided with an axially extending inner circumference thereof defining an axially extending gap between said axially extending inner circumference and an outer circumference of said output shaft;

means are provided for defining a small injection opening at an axially outer end of at least one of said non-magnetic annular shaped end plates to be communicated with said axially extending gap between said axially extending inner circumference for said at least one of said non-magnetic annular shaped end plates and the outer circumference of said output shaft; and a molding resin is filled through said injection opening in said axially extending gap, and hardened therein to tightly join said plurality of rotor cores and magnets of said rotor unit with said output shaft via said hardened molding resin.

2. A joint structure of a radial-type rotor and an output shaft according to claim 1, wherein outer peripheral surfaces of the magnets of said rotor unit are coated with said molding resin hardened after overflowing from said axially extending gap toward an outer circumference of said rotor unit, an outer diameter of said magnets coated with said hardened molding resin being less than that of an outermost circumference of said rotor unit.

3. A joint structure of a radial-type rotor and an output shaft according to claim 1, wherein said rotor is an elongated rotor comprising a plurality of rotor units contiguously and axially arranged in succession on said output shaft.

4. A joint structure of a radial-type rotor and an output shaft according to claim 2, wherein said rotor is an elongated rotor comprising a plurality of rotor units contiguously and axially arranged in succession on said output shaft.

5. A joint structure of a radial-type rotor and an output shaft according to claim 1, wherein said injection opening defined by said means comprises an axially extended groove formed in said output shaft at a predetermined position thereof.

6. A joint structure of a radial-type rotor and an output shaft according to claim 1, wherein said axially extending inner circumference of said rotor unit is a polygonal inner circumference to define said axially extending gap as a non-cylindrical annular gap to thereby enhance tightness of joining of said rotor unit and said output shaft via said hardened molding resin.

* * * * *